Aug. 4, 1953
M. L. YEATER
2,648,024
HEAT RETAINING MEANS FOR HYDROGEN THYRATRON
Filed Feb. 20, 1946
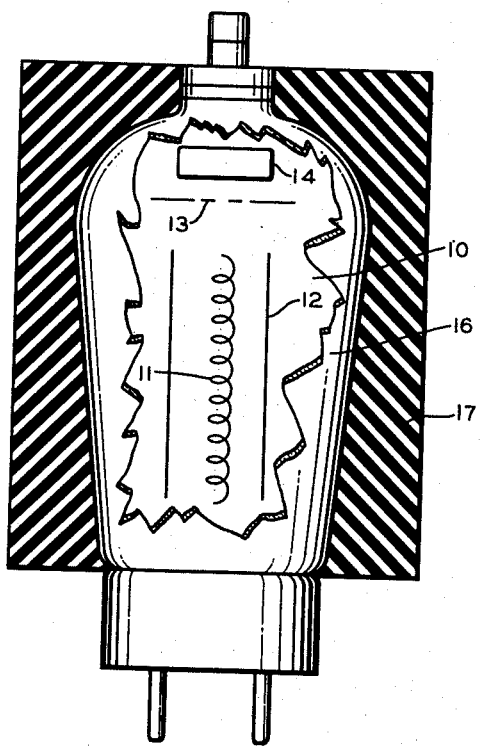
INVENTOR.
MAX L. YEATER
BY
ATTORNEY Patented Aug. 4, 1953

2,648,024

UNITED STATES PATENT OFFICE 2,648,024

HEAT RETAINING MEANS FOR HYDROGEN THYRATRON

Max L. Yeater, Boulder, Colo., assignor, by mesne assignments, to the United States of America as represented by the Secretary of the Navy Application February 20, 1946, Serial No. 649,091

6 Claims. (Cl. 313—47)

This invention relates to the prevention of gas clean-up in hydrogen thyratrons and more particularly, to raising the ambient temperature of the tube envelope so that adsorption will be minimized.

Heretofore, the life of the hydrogen thyratron tube was limited due to gas clean-up caused by adsorption of atomic hydrogen at the inner wall of the tube.

The object of the present invention is to overcome the difficulties created by gas clean-up due to adsorption of atomic hydrogen at the inner wall of the envelope of the hydrogen thyratron tube.

Another object of the present invention is to raise the ambient temperature of the hydrogen thyratron tube to minimize adsorption of atomic hydrogen at the inner wall of the envelope of the tube.

A further object is to provide a jacket for the hydrogen thyratron to accomplish the above objects.

A still further object is to provide other means of raising the temperature of the hydrogen thyratron tube to accomplish the first two objects.

These and other objects will become apparent from the following specification when taken in connection with the accompanying drawing, the single feature of which is a schematic illustration of one form of the invention.

The hydrogen thyratron is a tube designed for high peak currents and low tube drop. During the normal operation of the hydrogen thyratron atomic hydrogen is formed. This atomic hydrogen, over a period of time, will be adsorbed by the walls of the tube leaving a lesser amount of gas in the tube and causing a lowering of the gas pressure in the tube. This process is known in the art as gas clean-up and will lower the operating efficiency of the tube. This invention lies in the fact that raising the temperature of the tube envelope prevents the adsorption of atomic hydrogen, and gas clean-up will be minimized.

Referring to the figure, there is shown hydrogen thyratron tube 10 containing a heater 11, a cathode 12, a grid 13, and an anode 14. There is also shown a glass envelope 16 surrounded by a jacket 17, which may be constructed of "Bakelite" or other heat insulating material, which may be applied as two halves and joined together after application.

In operation, jacket 17 acts as an insulation to tube 10 causing glass envelope 16 of tube 10 to heat up and to retain its heat. A satisfactory temperature to which the hydrogen thyratron tube may be raised for best operation will vary between 150° C. and 200° C. At this range of temperature, whenever atomic hydrogen appears at glass envelope 16, adsorption cannot occur and gas clean-up is prevented.

The method of envelope heating as disclosed in the foregoing specification is illustrative only and alternate methods such as coating the outside of the envelope with black paint or using an oven to obtain the same results may be employed and in no way change the present invention.

While a particular embodiment of this invention has been disclosed and described, it is to be understood that various changes and modifications may be made therein without departing from the spirit and scope thereof as set fotrh in the appended claims.

What is claimed is:

1. An electron tube of the hydrogen thyratron type comprising, a glass envelope, said envelope being filled with hydrogen at a predetermined pressure, and a heat insulating jacket surrounding said envelope for maintaining said envelope at a temperature in excess of 150° centigrade.

2. An electron tube of the hydrogen thyratron type comprising, a glass envelope, said envelope being filled with hydrogen at a predetermined pressure, a heater element disposed within said envelope and a heat insulating jacket surrounding said envelope for limiting the heat dissipated from said envelope whereby said envelope is maintained at a temperature in excess of 150° centigrade.

3. An electron tube of the hydrogen thyratron type comprising, a glass envelope, said envelope being filled with hydrogen at a predetermined pressure, a heater element disposed within said envelope and a heat insulating jacket for limiting the heat dissipated by said envelope, said jacket being adapted to maintain said envelope at a temperature below the softening point of said envelope at which the adsorption of hydrogen by said envelope is a minimum.

4. An electron tube of the hydrogen thyratron type comprising, an envelope, said envelope being filled with hydrogen at a predetermined pressure, a heat source within said envelope, and an insulating coating surrounding said envelope, the heat retention properties of said coating being selected so as to maintain said envelope at a temperature below the softening point of said envelope at which adsorption of hydrogen by said envelope is a minimum during normal operation of said tube.

5. An electron tube of the hydrogen thyratron type comprising, an envelope, said envelope being filled with hydrogen at a predetermined pressure, a heater element disposed within said envelope and an insulating coating surrounding said envelope, the thickness and heat transfer properties of said coating being such that for normal operation of said electron tube said envelope is maintained at a temperature below the softening point of said envelope at which adsorption of hydrogen on said envelope is a minimum.

6. An electron tube of the hydrogen thyratron type comprising, an envelope, said envelope being filled with hydrogen at a predetermined pressure, a heat source within said envelope and an insulating coating surrounding said envelope, the heating retention properties of said coating being selected to maintain said envelope at a temperature between 150° centigrade and 200° centigrade during normal operation of said tube.

MAX L. YEATER.

References Cited in the file of this patent

UNITED STATES PATENTS

| Number | Name | Date |
|---|---|---|
| 1,615,983 | Jones | Feb. 1, 1927 |
| 1,685,766 | Mosher | Sept. 25, 1928 |
| 1,839,502 | Rudenberg et al. | Jan. 5, 1932 |
| 1,864,528 | Crawford et al. | June 28, 1932 |
| 1,982,319 | Perry | Nov. 27, 1934 |
| 2,363,109 | Keiffer | Nov. 21, 1944 |
| 2,399,003 | Crapuchettes | Apr. 23, 1946 |